United States Patent
Unno et al.

(10) Patent No.: US 9,464,682 B2
(45) Date of Patent: Oct. 11, 2016

(54) NON-ASBESTOS FRICTION MATERIAL COMPOSITION, AND FRICTION MATERIAL AND FRICTION MEMBER USING SAME

(75) Inventors: Mitsuo Unno, Ibaraki (JP); Kazuya Baba, Ibaraki (JP); Takashi Kikudome, Ibaraki (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 13/819,726

(22) PCT Filed: Nov. 7, 2011

(86) PCT No.: PCT/JP2011/075637
§ 371 (c)(1),
(2), (4) Date: May 10, 2013

(87) PCT Pub. No.: WO2012/066963
PCT Pub. Date: May 24, 2012

(65) Prior Publication Data
US 2013/0220746 A1    Aug. 29, 2013

(30) Foreign Application Priority Data
Nov. 19, 2010 (JP) ................... 2010-259498

(51) Int. Cl.
*F16D 69/02* (2006.01)
*F16D 65/092* (2006.01)

(52) U.S. Cl.
CPC ........... *F16D 69/028* (2013.01); *F16D 65/092* (2013.01); *F16D 69/026* (2013.01)

(58) Field of Classification Search
CPC .. F16D 69/025; F16D 69/026; F16D 69/027; F16D 69/028
USPC ..................................................... 188/251 A
See application file for complete search history.

(56) References Cited

U.S. PATENT DOCUMENTS

| | | | | |
|---|---|---|---|---|
| 4,944,373 A | * | 7/1990 | Ohya et al. ............... | 188/251 A |
| 6,220,404 B1 | * | 4/2001 | Hara et al. ................ | 188/251 A |
| 8,172,051 B2 | * | 5/2012 | Subramanian ........... | 188/251 M |

FOREIGN PATENT DOCUMENTS

| | | |
|---|---|---|
| JP | 4-304284 | 10/1992 |
| JP | 2002-138273 | 5/2002 |
| JP | 2008-179806 | 8/2008 |
| JP | 2009-126903 | 6/2009 |

OTHER PUBLICATIONS

Yun et al., "Performance and Evaluation of eco-friendly brake friction materials", May 8, 2010, Tibology Interational, vol. 43, p. 2010-2019.*
Washington State Senate Bill 6557, 61st Legislature 2010 Regular Session, Mar. 8, 2010.*

* cited by examiner

*Primary Examiner* — Anna Momper
(74) *Attorney, Agent, or Firm* — Fitch, Even, Tabin & Flannery, LLP

(57) ABSTRACT

The non-asbestos frictional material composition containing a binder, an organic filler, an inorganic filler, and a fiber base material includes: copper in a content of 5 mass % or less as a copper element; a metal fiber other than a copper fiber and a copper alloy fiber in a content of 0.5 mass % or less; iron powder and tin powder as the inorganic filler in a total content of 1-12 mass %. The non-asbestos frictional material composition can provide a frictional material with excellent friction coefficient, anti-crack properties, and abrasion resistance even with the reduced content of copper and a copper fiber that possibly cause environmental pollution. The frictional material and the friction member are formed by using the above-mentioned non-asbestos frictional material composition.

19 Claims, 1 Drawing Sheet

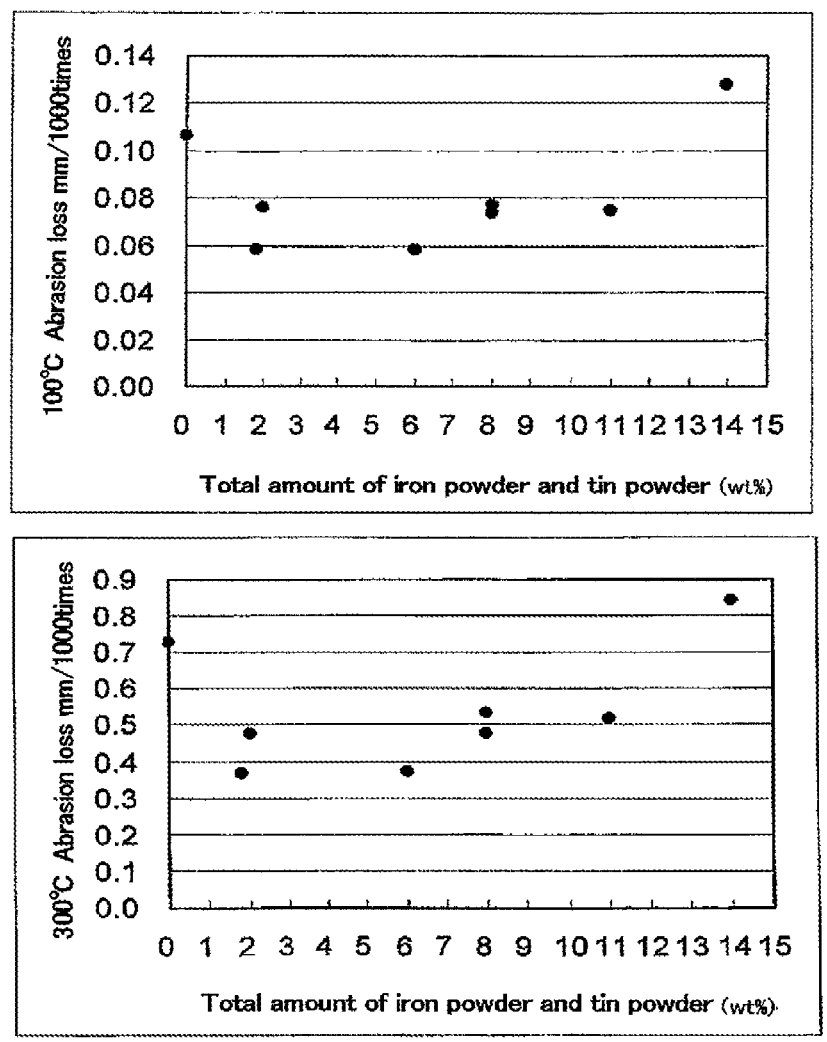

NON-ASBESTOS FRICTION MATERIAL COMPOSITION, AND FRICTION MATERIAL AND FRICTION MEMBER USING SAME

TECHNICAL FIELD

The present invention relates to a non-asbestos frictional material composition, and a frictional material and a friction member formed by using the composition. Specifically, the present invention relates to a non-asbestos frictional material composition with low environmental load due to the low content of copper and with excellent friction coefficient, anti-crack properties, and abrasion resistance, which is appropriate for frictional materials such as a disc brake pad and a brake lining to brake a car and the like. The present invention further relates to a frictional material and a friction member formed by using this non-asbestos frictional material composition.

BACKGROUND ART

Frictional materials such as a disc brake pad and a brake lining are used for braking a car and the like. The frictional materials play a role in the brake by frictioning facing members such as a disc rotor and a brake drum. Therefore, for the frictional materials, not only increasing and stabilizing the friction coefficient but also hardly wearing the disc rotor that is a facing member (anti-rotor-abrasion resistance), hardly generating the squeal (squeal properties), and prolonging the life of the pad (abrasion resistance) are required. The durability performance such as no shearing during the braking at a high load (shear strength) or no cracks by the high temperature braking history (anti-crack properties) are also required.

A frictional material includes a binder, a fiber base material, an inorganic filler, and an organic filler, generally in combination with one or two or more kinds thereof to provide the above-mentioned properties. As the fiber base material, an organic fiber, a metal fiber, an inorganic fiber, and the like are used. To improve the anti-crack properties and the abrasion resistance, a copper fiber and a copper alloy fiber are generally used as the metal fiber. To further improve the abrasion resistance, chips and powders of copper and copper alloy may be used. As the frictional material, a non-asbestos frictional material is a mainly used, which is formed by using a large amount of copper, copper alloy, and the like.

However, the frictional material containing copper and copper alloy generates abrasion powder containing copper during the braking. It is suggested that the abrasion powder leads to pollution of rivers, lakes, and oceans.

To provide a frictional material containing no copper or copper alloy with excellent friction coefficient, abrasion resistance, and rotor abrasion resistance, it is proposed that the frictional material for the brake with a fiber base material, a binder, and a friction adjustment component do not contain a heavy metal or a heavy-metal compound and that the frictional material contains magnesium oxide and graphite in a content of 45-80 vol %, in which the ratio of magnesium oxide to graphite is 1/1-4/1 (see to Patent Literature 1).

CITATION LIST

Patent Literature

PTL1: JP 2002-138273A

DISCLOSURE OF THE INVENTION

However, the frictional material for the brake of Patent document 1 hardly satisfies all of the friction coefficient, the anti-crack properties, and the abrasion resistance.

On the other hand, as metal fibers other than a copper fiber contained in the frictional material, iron fibers such as a steel fiber and a cast iron fiber are used for the purpose of improving the anti-crack properties. However, iron fibers have a disadvantage of the high aggression to a facing member. Nonferrous metal fibers such as a zinc fiber and an aluminum fiber generally used for a frictional material as metal fibers other than a copper fiber often have a low heatproof temperature compared with a copper fiber and an iron fiber. This causes a problem of the deteriorated abrasion resistance of the frictional material. An inorganic fiber is used to improve the anti-crack properties of the frictional material. However, to obtain the satisfied anti-crack properties, a large amount of inorganic fiber should be added. This causes a problem of the deteriorated abrasion resistance.

It is known that the use of graphite can improve the abrasion resistance of the frictional material. However, to obtain the satisfied anti-crack properties, a large amount of graphite should be added. This causes a problem of the substantially lowered friction coefficient.

As mentioned above, the frictional material containing the reduced content of copper has poor abrasion resistance and anti-crack properties and hardly satisfies all of the friction coefficient, the anti-crack properties, and the abrasion resistance.

In view of such a background, the objective of the present invention is to provide a non-asbestos frictional material composition capable of providing a frictional material with excellent friction coefficient, anti-crack properties, abrasion resistance and to provide a frictional material and a friction member formed by using this non-asbestos frictional material composition, even with the reduced content of copper and copper possibly causing pollution of rivers, lakes, oceans and the like.

As a result of their great effort, the present inventors have found that the above-mentioned problem can be solved by a non-asbestos frictional material composition containing copper and a metal fiber at a certain level or less, a specific amount of iron powder and a specific amount of tin powder so as to achieve the present invention.

The present invention is as follows.

(1) A non-asbestos frictional material composition containing a binder, an organic filler, an inorganic filler, and a fiber base material, comprising: copper in a content of 5 mass % or less as a copper element; a metal fiber other than a copper fiber and a copper alloy fiber in a content of 0.5 mass % or less; iron powder and tin powder as the inorganic filler in a total content of 1-12 mass %.

(2) The non-asbestos frictional material composition according to (1), wherein the content of the iron powder falls within the range of 1-4 mass %.

(3) A frictional material is formed from the non-asbestos frictional material composition according to (1) or (2).

(4) A friction member is formed from a frictional material formed from the non-asbestos frictional material composition according to (1) or (2) and a backing plate.

Advantageous Effects of the Invention

When used for frictional materials such as a disc brake pad and a brake lining for a car, the non-asbestos frictional material composition of the present invention has low environmental load due to the low content of copper in abrasion powder generated during the braking and can provide excellent friction coefficient, anti-crack properties, and abrasion resistance. The use of the non-asbestos frictional material composition of the present invention can provide a frictional material and a friction member with the above-mentioned properties.

BRIEF DESCRIPTION OF THE DRAWINGS

FIG. 1 shows a graph illustrating the abrasion loss corresponding to 1000 times of braking at 100° C. or 300° C. to the total content (mass %) of the iron powder and the tin powder in evaluation of the abrasion resistance for Examples and Comparative examples.

PREFERRED MODE FOR CARRYING OUT THE INVENTION

The non-asbestos frictional material composition of the present invention, and a frictional material and a friction member formed by using the composition will be described in detail below.

[Non-Asbestos Frictional Material Composition]

The non-asbestos frictional material composition of the present invention containing a binder, an organic filler, an inorganic filler, and a fiber base material includes: copper in a content of 5 mass % or less as a copper element; a metal fiber other than a copper fiber and a copper alloy fiber in a content of 0.5 mass % or less; iron powder and tin powder as the inorganic filler in a total content of 1-12 mass %.

According to this structure, the non-asbestos frictional material composition of the present invention has low environmental pollution due to the low content of copper in abrasion powder generated during the braking and can provide excellent friction coefficient, anti-crack properties, and abrasion resistance compared with conventional ones.

(Binder)

The binder binds an organic filler, an inorganic filler, a fiber base material, and the like in the frictional material composition to provide strength. As the binder contained the non-asbestos frictional material composition of the present invention, any binders can be used without any limitation in particular as long as being thermosetting resins typically used as a binder of the frictional material.

The above-mentioned thermosetting resins include, for example, a phenol resin; various elastomer-dispersed phenol resins such as an acrylic elastomer-dispersed phenol resin and a silicone elastomer-dispersed phenol resin; and various modified phenol resins such as an acrylic-modified phenol, a silicone-modified phenol resin, a cashew-modified phenol resin, an epoxy-modified phenol resin, and an alkylbenzene-modified phenol resin. These can be used alone or in combination with two or more kinds thereof. In particular, a phenol resin, an acrylic-modified phenol resin, a silicone-modified phenol resin, and an alkylbenzene-modified phenol resin are preferable for providing excellent heat resistance, moldability, and friction coefficient.

The content of the binder in the non-asbestos frictional material composition of the present invention is preferably 5-20 mass %, more preferably 5-10 mass %. The content of the binder adjusted to 5-20 mass % can further prevent the reduced strength of the frictional material and the deterioration of the sound vibration performance such as squeal due to the reduced porosity and the increased elastic modulus of the frictional material.

(Organic Filler)

The organic filler is contained as a friction modifier to improve the sound vibration performance, the abrasion resistance, and the like of the frictional material. As the organic filler contained in the non-asbestos frictional material composition of the present invention, any organic fillers can be used without any limitation in particular as long as delivering the above-mentioned performance. Cashew dust, a rubber component, and the like can typically be used as organic fillers.

As the above-mentioned cashew dust, any cashew dust, which is obtained by grinding cured cashew nut shell oil, may be used as long as typically used for a frictional material.

The above-mentioned rubber component includes, for example, natural rubber, acrylic rubber, isoprene rubber, polybutadiene rubber (BR), nitrile-butadiene rubber (NBR), and styrene-butadiene rubber (SBR). These can be used alone or in combination with two or more kinds thereof. The cashew dust and the rubber component may be used together, or the cashew dust coated with the rubber component may be used. As the organic filler, the cashew dust and the rubber component is preferably used together from the viewpoint of the sound vibration performance.

The content of the organic filler in the non-asbestos frictional material composition of the present invention is preferably 1-20 mass %, more preferably 1-10 mass %, further more preferably 3-8 mass %. The content of the organic filler adjusted to 1-20 mass % can prevent the increased elastic modulus of the frictional material, the deteriorated sound vibration performance such as squeal, the deteriorated heat resistance, and the reduced strength due to the heat history. When the cashew dust and the rubber component are used together, the mass ratio of the cashew dust to the rubber component preferably falls within the range of 2:1-10:1, more preferably 3:1-9:1, further more preferably 3:1-8:1.

(Inorganic Filler)

The inorganic filler is contained as a friction modifier to prevent the heat resistance of the frictional material from deteriorating.

The non-asbestos frictional material composition of the present invention contains iron powder and tin powder as the inorganic filler.

As the above-mentioned iron powder, the mean particle size is preferably 0.1-100 µm, more preferably 0.1-90 µm, further more preferably 0.1-80 µm, from the viewpoint of the abrasion resistance. The shape is preferably a particle form from the viewpoint of the abrasion resistance.

As the above-mentioned tin powder, the mean particle size is preferably 0.1-100 µm, more preferably 0.1-90 µm, further more preferably 0.1-80 µm, from the viewpoint of the abrasion resistance. The shape is preferably a particle form from the viewpoint of the abrasion resistance.

The total content of the iron powder and the tin powder in the non-asbestos frictional material composition of the present invention is preferably 1-12 mass %, more preferably 2-11 mass %. As shown in the graph (FIG. 1) illustrating the abrasion loss corresponding to 1000 times of braking at 100° C. or 300° C. to the total content (mass %) of the iron powder and the tin powder in evaluation of the abrasion resistance for the below-mentioned Examples and Comparative examples, abrasion grows at 100° C. and 300° C. when the total content of the iron powder and the tin powder is less than 1 mass % or more than 12 mass %.

The content of the iron powder in the non-asbestos frictional material composition preferably falls within the range of 1-4 mass %. The content of the iron powder adjusted to 1 mass % or more can provide excellent friction coefficient, anti-crack properties, and abrasion resistance. The content adjusted to 4 mass % or less can prevent the abrasion resistance from deteriorating.

The non-asbestos frictional material composition of the present invention can contain an inorganic filler other than the above-mentioned iron powder and tin powder.

As such an inorganic filler, any inorganic fillers are used without limitation as long as typically used for a frictional material. As the inorganic filler, for example, antimony trisulfide, tin sulfide, molybdenum disulfide, iron sulfide, bismuth sulfide, zinc sulfide, calcium hydroxide, calcium oxide, sodium carbonate, calcium carbonate, magnesium carbonate, barium sulfate, dolomite, coke, graphite, mica, iron oxide, vermiculite, calcium sulphate, granular potassium titanate, plate-like potassium titanate, talc, clay, zeolite, zirconium silicate, zirconium oxide, mullite, chromite, titanium oxide, magnesium oxide, silica, and an activated alumina such γ-alumina can be used. These can be used alone in combination with two or more kinds thereof.

The content of the inorganic filler other than iron powder and tin powder in the non-asbestos frictional material composition of the present invention is preferably 30-80 mass %, more preferably 40-75 mass %, further more preferably 50-75 mass %. The content of the inorganic filler adjusted to 30-80 mass % can prevent the heat resistance from deteriorating, which is preferable in point of the content balance against other components of the frictional material.

(Fiber Base Material)

The fiber base material exhibits a reinforcement effect on the frictional material. As the fiber base material contained in the non-asbestos frictional material composition of the present invention, any fiber materials can be used without any limitation in particular as long as delivering the above-mentioned performances. The fiber base material used in the present invention includes a metal fiber, an inorganic fiber, an organic fiber, and a carbon fiber as typically used as a fiber base material. These can be used alone or in combination with two or more kinds thereof.

As the above-mentioned metal fiber, a copper fiber or copper alloy fiber can be used to improve the anti-crack properties and the abrasion resistance. However, when a copper fiber or a copper alloy fiber is contained in the non-asbestos frictional material composition of the present invention, the total content of copper in the frictional material composition should be 5 mass % or less as a copper element from the viewpoint of preventing environmental pollution, which is preferably 0.5 mass % or less.

The copper fiber or the copper alloy fiber includes a copper fiber, a brass fiber, and a bronze fiber. These can be used alone or in combination with two or more kinds thereof.

As the above-mentioned metal fiber, a metal fiber other than a copper fiber and a copper alloy fiber may be used for the non-asbestos frictional material composition of the present invention from the viewpoint of improving the friction coefficient and the anti-crack properties. However, the content should be 0.5 mass % or less from the viewpoint of preventing the abrasion resistance from deteriorating. On the other hand, since metal fibers other than a copper fiber and a copper alloy fiber improve the friction coefficient but easily deteriorate the abrasion resistance, no metal fibers other than a copper fiber and a copper alloy fiber are preferably contained (0 mass %).

The metal fiber other than a copper fiber and a copper alloy fiber includes, for example, fibers of metals such as aluminum, iron, zinc, tin, titanium, nickel, magnesium, silicon alone, or the alloy thereof, and a fiber mainly containing metal, such as a cast iron fiber. These can be used alone or in combination with two or more kinds thereof.

The above-mentioned inorganic fiber includes a ceramic fiber, a biodegradable ceramic fiber, a mineral fiber, a glass fiber, a potassium titanate fiber, a silicate fiber, and wollastonite. These can be used alone or in combination with two or more kinds thereof.

Among these inorganic fibers, a potassium titanate fiber and a ceramic fiber, which are inhaled into a lung and the like, are preferably not contained from the viewpoint of decreasing the environmental load material.

The mineral fiber is referred herein to as an artificial inorganic fiber in which blast furnace slag for slag wool, basalt for basalt fiber, and other natural stone are melt-spun as the main component. The mineral fiber is preferably a natural mineral containing an Al element. Specifically, the mineral fiber containing $SiO_2$, $Al_2O_3$, CaO, MgO, FeO, $Na_2O$, and the like alone or in combination with two or more kinds thereof can be used. Preferably, the mineral fiber containing an Al element can be used. As the mean fiber length of the total mineral fiber contained in the frictional material composition increases, the bond strength with each of the components of the frictional material composition tends to be decreased. Therefore, the mean fiber length of the entire mineral fiber is preferably 500 μm or less, more preferably 100-400 μm. The mean fiber length is referred herein to as the number average fiber length indicating the average length of the total corresponding fibers. For example, the mean fiber length of 200 μm indicates that the average length of 50 mineral fibers which are randomly selected and then measured with a light microscope is 200 μm.

The mineral fiber used in the present invention is preferably biosoluble from the viewpoint of the harmful effect on a human body. The biosoluble mineral fiber is referred herein to as a mineral fiber with the feature to be partially broken down in a short time and eliminated from the body even when entering a human body. Specifically, the biosoluble mineral fiber denotes a fiber satisfying the condition in which the chemical composition shows that the total content of an alkali oxide and an alkaline earth oxide (oxides of sodium, potassium, calcium, magnesium, and barium) is 18 mass % or more, in which the short-term continuous aspiration test shows the half-life of 20 μm or more of fiber is 40 days or less, in which the intraperitoneal test shows no evidence for excessive carcinogenic properties, or in which the long-term continuous aspiration test shows no associated pathogenesis or tumorigenesis (Nota Q of EU directive 97/69/EC (exempted from the carcinogenic classification)). Such a biodegradable mineral fiber includes $SiO_2$—$Al_2O_3$—CaO—MgO—FeO—$Na_2O$ type fiber, and a fiber containing $SiO_2$, $Al_2O_3$, CaO, MgO, FeO, and $Na_2O$ in any combination thereof. The commercially available product includes the Roxul fibers produced by LAPINUS FIBRES B.V. The Roxul contains $SiO_2$, $Al_2O_3$, CaO, MgO, FeO, and $Na_2O$.

The above-mentioned organic fiber includes an aramid fiber, a cellulose fiber, an acrylic fiber, and a phenol resin fiber. These can be used alone or in combination with two or more kinds thereof.

The above-mentioned carbon fiber includes a flame-resistant fiber, a pitch-based carbon fiber, PAN (a polyacrylonitrile) carbon fiber, and an active carbon fiber. These can be used alone or in combination with two or more kinds thereof.

The content of the fiber base material, including a copper fiber or a copper alloy fiber in the non-asbestos frictional material composition of the present invention is preferably 5-40 mass %, more preferably 5-20 mass %, further more preferably 5-15 mass %. The content of the fiber base material adjusted to 5-40 mass % provides an appropriate porosity as the frictional material so as to prevent squeal and to provide an appropriate material strength, abrasion resistance, and excellent moldability.

(Other Materials)

In the non-asbestos frictional material composition of the present invention, materials other than the binder, the organic filler, the inorganic filler, the fiber base material, the iron powder, and the tin powder can optionally be blended.

For example, unless the total content of copper in the non-asbestos frictional material composition of the present invention exceeds 5 mass % as a copper element, metal powder such as copper powder, brass powder, and bronze powder can be blended. For example, to improve the abrasion resistance, an organic additive including a fluorine polymer such as PTFE (polytetrafluoroethylene) can be blended.

[Frictional Material and Friction Member]

The present invention also provides a frictional material and a friction member formed by using the above-mentioned non-asbestos frictional material composition.

The non-asbestos frictional material composition of the present invention can be molded for the use as frictional materials such as a disc brake pad and a brake lining for a car. The frictional material of the present invention exhibits excellent friction coefficient, anti-crack properties, and abrasion resistance and is therefore suitable for a disc brake pad with a large load during the braking.

Through the use of the above-mentioned frictional material, a friction member, which is formed so that the frictional material is the frictional surface, can be obtained. The friction member of the present invention that can be formed by using the frictional material includes, for example, the following structures.

Structure (1): Only the frictional material is contained.

Structure (2): A backing plate and the frictional material consisting of the non-asbestos frictional material composition of the present invention are contained, in which the frictional material is formed to be the frictional surface on the backing plate.

Structure (3): In the structure (2), a primer layer to modify the surface for improving the adhesive effect of the backing plate and an adhesive layer to bond the backing plate with the frictional material are placed between the backing plate and the frictional material.

The above-mentioned backing plate is typically used for a friction member to improve the mechanical strength of the friction member. As the material of the backing plate, a metal, a fiber-reinforced plastic, or the like can be used. The material, for example, includes iron, stainless steel, inorganic fiber-reinforced plastic, and a carbon fiber-reinforced plastic. As the material of the backing plate, a metal, a fiber-reinforced plastic, or the like can be used. The material, for example, includes iron, stainless steel, inorganic fiber-reinforced plastic, and a carbon fiber-reinforced plastic. As the primer layer and the adhesive layer, any materials may be used as long as used for a friction member such as a brake shoe.

The frictional material of the present invention can be fabricated using a generally used method by molding, preferably hot press-molding the non-asbestos frictional material composition of the present invention.

Specifically, the non-asbestos frictional material composition of the present invention is uniformly mixed by using a mixer such as a Loedige mixer, a pressure kneader, and an Eirich intensive mixer. The mixture is preformed in a mold. The obtained preformed material is molded under the condition at a molding temperature of 130-160° C. and a molding pressure of 20-50 MPa for 2-10 minutes. The obtained molded product is heated at 150-250° C. for 2-10 hours. The frictional material can be fabricated by coating, scorching, and polishing as needed.

The non-asbestos frictional material composition is useful as the "over layer" of friction members such as a disc brake pad and a brake lining due to excellent friction coefficient, anti-crack properties, and abrasion resistance. The frictional material can be used for being formed as the "under layer" of friction members due to the high anti-crack properties as the frictional material.

The "over layer" is the frictional material formed so as to be the frictional surface of the friction member. The "under layer" is a layer placed between the frictional material formed to be the frictional surface of the friction member and the backing plate in order to improve the shear strength and the anti-crack properties around the part bonding the frictional material with the backing plate.

EXAMPLES

The present invention will be described in detail in reference to Examples. However, the present invention is not limited to these examples.

The evaluation shown in Examples and Comparative examples were conducted as follows.

(1) Evaluation of Friction Coefficient

The friction coefficient was measured based on Japanese Automotive Standards Organization JASO C406. The average of friction coefficients measured in the second effectiveness test was calculated.

(2) Evaluation of Anti-Crack Properties

The braking was repeated at a brake temperature of 400° C. (initial speed: 50 km/h, closing speed: 0 km/h, deceleration: 0.3 G, brake temperature before braking: 100° C.) based on JASO C427 until the thickness of the each frictional material was reduced to half. The generation of cracks on the side face and the frictional surface of the each frictional material was measured. The generation of cracks was evaluated with the following scores 1-3.

Score 1: No cracks were generated.

Score 2: Cracks were generated to the extent where a 0.1 mm thickness gauge does not enter the frictional surface or the side face of the frictional material.

Score 3: Cracks were generated to the extent where a 0.1 mm thickness gauge enters the frictional surface or the side face of the frictional material.

When cracks were generated to the extent where a 0.1 mm thickness gauge does not enter one of the frictional surface and the side face of the frictional material but enters the other, the generation of cracks was evaluated as Score 3.

Evaluation of Abrasion Resistance

The abrasion resistance was measured based on Japanese Automotive Standards Organization JASO C427. The abrasion loss of the each frictional material, which corresponds to 1000 times of braking at brake temperatures of 100° C. and 300° C., were evaluated.

The friction coefficient, the abrasion resistance, and the anti-crack properties were evaluated at an inertia of 7 kgf·m·s² with a dynamometer based on the above-mentioned JASO C406 and JASO C427. The above-mentioned evaluation was carried out using a ventilated disc rotor (material: FC190, available from KIRIU Corporation) and a general pin sliding collet type caliper.

Examples 1-6 and Comparative Examples 1-5

Production of Disc Brake Pad

The materials were blended according to the blend ratio shown in Table 1 to obtain the frictional material compositions of Examples and Comparative examples. Each of The frictional material compositions was mixed using a Loedige mixer (available from MATSUBO Corporation, brand name: Loedige mixer M20). This mixture was preformed with a molding press (available from OJIKIKAI CO., LTD). The obtained preformed material was hot press-molded together with a backing plate (available from Hitachi Automotive Systems, Ltd.) using a molding press (SANKI SEIKO CO., LTD.) under the condition at a molding temperature of 145° C. and a molding pressure of 30 MPa for 5 minutes. The obtained molded article was heated at 200° C. for 4.5 hours, polished with a rotary polisher, and then scorched at 500° C. to obtain the disc brake pads (frictional material thickness: 11 mm, frictional material projected area: 52 cm²).

The evaluation results for the produced disc brake pads are shown in Table 1.

From the results of evaluation of the abrasion resistance, a graph illustrating the abrasion loss corresponding to 1000 times of braking at 100° C. or 300° C. to the total content (mass %) of the iron powder and the tin powder is shown in FIG. 1.

Various materials used in Examples and Comparative examples are as follows.

(Binder)
  Phenol resin: available from Hitachi Chemical Co., Ltd. (brand name: HP491UP)
(Organic Filler)
  Cashew dust: available from Tohoku Chemical Industries, Ltd (brand name: FF-1056)
  SBR powder
(Inorganic Filler)
  Barium sulfate: available from SAKAI CHEMICAL INDUSTRY CO., LTD. (brand name: BA)
  Potassium titanate: available from Kubota Corporation (Brand name: TXAX-MA, plate-like potassium titanate)
  Mica
  Graphite: available from TIMCAL (brand name: KS75)
  Coke: available from TIMCAL (brand name: FC250-1500)
  Calcium hydroxide
  Zirconium oxide
(Iron Powder and Tin Powder)
  Iron powder: available from FUKUDA METAL FOIL & POWDER Co., LTD. (brand name: Fe-S-350, particle size: <50 μm, shape: particle)
  Tin powder: available from GRIPM Advanced Materials Co., LTD. (brand name FSn-2, particle size: <74 μm, and shape: particle)
(Fiber Base Material)
  Aramid fiber (organic fiber): available from DU PONT-TORAY CO., LTD. (brand name: 1F538)
  Iron fiber (metal fiber): available from GMT (brand name: #0)
  Copper fiber (metal fiber): available from Sunny Metal (brand name: SCA-1070)
  Mineral fiber (inorganic fiber): available from LAPINUS FIBRES B.V (brand name: RB240Roxul 1000, mean fiber length: 300 μm)

TABLE 1

|  |  |  | Examples ||||||  Comparative examples |||||
| --- | --- | --- | --- | --- | --- | --- | --- | --- | --- | --- | --- | --- | --- |
|  |  |  | 1 | 2 | 3 | 4 | 5 | 6 | 1 | 2 | 3 | 4 | 5 |
| Frictional material composition (%)* | Binder | Phenol resin | 8 | 8 | 8 | 8 | 8 | 8 | 8 | 8 | 8 | 8 | 8 |
|  | Organic filler | Cashew dust | 5 | 5 | 5 | 5 | 5 | 5 | 5 | 5 | 5 | 5 | 5 |
|  |  | SBR powder | 1 | 1 | 1 | 1 | 1 | 1 | 1 | 1 | 1 | 1 | 1 |
|  | Inorganic filler | Barium sulfate | 36 | 32 | 30 | 27 | 34 | 36 | 38 | 24 | 35 | 27 | 35 |
|  |  | Potassium titanate | 12 | 12 | 12 | 12 | 12 | 12 | 12 | 12 | 12 | 12 | 12 |
|  |  | Mica | 5 | 5 | 5 | 5 | 5 | 5 | 5 | 5 | 5 | 5 | 5 |
|  |  | Graphite | 3 | 3 | 3 | 3 | 3 | 3 | 3 | 3 | 3 | 3 | 3 |
|  |  | Coke | 2 | 2 | 2 | 2 | 2 | 2 | 2 | 2 | 2 | 2 | 2 |
|  |  | Calcium hydroxide | 2 | 2 | 2 | 2 | 2 | 2 | 2 | 2 | 2 | 2 | 2 |
|  |  | Zirconium oxide | 15 | 15 | 15 | 15 | 15 | 15 | 15 | 15 | 15 | 15 | 15 |
|  |  | Iron powder | 1 | 4 | 5 | 7 | 5 | 0.5 | 0 | 9 | 0 | 0 | 1 |
|  |  | Tin powder | 1 | 2 | 3 | 4 | 3 | 1.5 | 0 | 5 | 3 | 0 | 1 |
|  | Fiber base material | Aramid fiber | 2 | 2 | 2 | 2 | 2 | 2 | 2 | 2 | 2 | 2 | 2 |
|  |  | Iron fiber | 0 | 0 | 0 | 0 | 0 | 0 | 0 | 0 | 0 | 0 | 1 |
|  |  | Copper fiber | 4 | 4 | 4 | 4 | 0 | 4 | 4 | 4 | 4 | 15 | 4 |
|  |  | Mineral fiber | 3 | 3 | 3 | 3 | 3 | 3 | 3 | 3 | 3 | 3 | 3 |
| Content of copper as copper element (mass %) |  |  | 4 | 4 | 4 | 4 | 0 | 4 | 4 | 4 | 4 | 15 | 4 |
| Content of metal fiber other than copper fiber and copper alloy fiber (Iron fiber) (mass %) |  |  | 0 | 0 | 0 | 0 | 0 | 0 | 0 | 0 | 0 | 0 | 1 |
| Total content of iron powder and tin powder (mass %) |  |  | 2 | 6 | 8 | 11 | 8 | 2 | 0 | 14 | 3 | 0 | 2 |
| Evaluation | Friction coefficient |  | 0.40 | 0.42 | 0.39 | 0.38 | 0.38 | 0.38 | 0.36 | 0.38 | 0.36 | 0.39 | 0.43 |

TABLE 1-continued

|  | Examples | | | | | | Comparative examples | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| Anti-crack properties | Score 1 | Score 1 | Score 1 | Score 1 | Score 1 | Score 1 | Score 3 | Score 2 | Score 2 | Score 1 | Score 1 |
| Abrasion 100° C. | 0.06 | 0.06 | 0.08 | 0.07 | 0.07 | 0.08 | 0.11 | 0.13 | 0.13 | 0.08 | 0.12 |
| resistance 300° C. (mm/1000 times) | 0.37 | 0.37 | 0.48 | 0.52 | 0.53 | 0.48 | 0.73 | 0.84 | 0.82 | 0.50 | 0.85 |

(%)*: Mass % in frictional material composition

Examples 1-6 exhibit friction coefficient, anti-crack properties, and abrasion resistance on about the same level as those of Comparative example 4 containing a large amount of copper. Furthermore, Examples 1-6 clearly shows excellent anti-crack properties and abrasion resistance compared with Comparative example 1 containing iron powder and tin powder in a total content of less than 1 mass %, Comparative example 2 containing iron powder and tin powder in a total content of more than 12 mass %, and Comparative example 3 containing no iron powder but only tin powder. Yet furthermore, Examples 1-6 clearly shows excellent abrasion resistance compared with Comparative example 5 further containing a metal fiber other than a copper fiber and a copper alloy fiber in a content of more than 0.5 mass %.

Comparing Examples 1 and 2 with Examples 3-6 shows that iron powder contained in a content of 1-4 mass % further improves the abrasion resistance.

INDUSTRIAL APPLICABILITY

The non-asbestos frictional material composition of the present invention has low environmental pollution due to the low content of copper in abrasion powder generated during the braking, can provide excellent friction coefficient, anti-crack properties, and abrasion resistance, and is therefore useful for frictional materials and friction members, such as a disc brake pad and a brake lining of a car.

The invention claimed is:

1. A non-asbestos frictional material composition containing a binder, an organic filler, an inorganic filler, and a fiber base material, comprising: copper in a content of 5 mass % or less as a copper element; a metal fiber other than a copper fiber and a copper alloy fiber in a content of 0.5 mass % or less; and both iron powder and tin powder as the inorganic filler in a total content of 1-12 mass %.

2. The non-asbestos frictional material composition according to claim 1, wherein the content of the iron powder falls within the range of 1-4 mass %.

3. A friction member comprising a frictional material formed from the non-asbestos frictional material composition according to claim 2 and a backing plate.

4. A friction member comprising a frictional material formed from the non-asbestos frictional material composition according to claim 1 and a backing plate.

5. The non-asbestos frictional material composition according to claim 1, wherein the content of the binder falls within the range of 5-20 mass %.

6. The non-asbestos frictional material composition according to claim 1, wherein the content of the organic filler falls within the range of 1-20 mass %.

7. The non-asbestos frictional material composition according to claim 1, wherein the content of the inorganic filler other than iron powder and tin powder in the non-asbestos frictional material composition of the present invention is 30-80 mass %.

8. The non-asbestos frictional material composition according to claim 1, wherein the content of the fiber base material falls within the range of 5-40 mass %.

9. The non-asbestos frictional material composition according to claim 1, wherein the content of the binder falls within the range of 5-20 mass %, the content of the organic filler falls within the range of 1-20 mass %, the content of the inorganic filler other than iron powder and tin powder in the non-asbestos frictional material composition of the present invention is 30-80 mass %, and the content of the fiber base material falls within the range of 5-40 mass %.

10. A disk brake pad comprising the non-asbestos frictional material composition according to claim 9 molded to provide a pad having a frictional surface.

11. The disk brake pad according to claim 10, further comprising a backing plate bonded to a surface of the pad opposite the frictional surface.

12. A brake lining comprising the non-asbestos frictional material composition according to claim 9 molded to provide a lining having a frictional surface.

13. The brake lining according to claim 12, further comprising a backing plate bonded to a surface of the lining opposite the frictional surface.

14. A disk brake pad comprising the non-asbestos frictional material composition according to claim 1 molded to provide a pad having a frictional surface.

15. The disk brake pad according to claim 14, further comprising a backing plate bonded to a surface of the pad opposite the frictional surface.

16. A brake lining comprising the non-asbestos frictional material composition according to claim 1 molded to provide a lining having a frictional surface.

17. The brake lining according to claim 16, further comprising a backing plate bonded to a surface of the lining opposite the frictional surface.

18. A frictional material formed from a non-asbestos frictional material composition containing a binder, an organic filler, an inorganic filler, and a fiber base material, comprising: copper in a content of 5 mass % or less as a copper element; a metal fiber other than a copper fiber and a copper alloy fiber in a content of 0.5 mass % or less; and both iron powder and tin powder as the inorganic filler in a total content of 1-12 mass %.

19. The frictional material according to claim 18, wherein the content of the iron powder falls within the range of 1-4 mass %.

* * * * *